United States Patent

[11] 3,587,353

| [72] | Inventor | Tetsuya Iijima |
| | | Tokyo, Japan |
| [21] | Appl. No. | 822,260 |
| [22] | Filed | May 6, 1969 |
| [45] | Patented | June 28, 1971 |
| [73] | Assignee | Nissan Motor Company, Ltd. |
| | | Yokohama, Japan |
| [32] | Priority | May 13, 1968 |
| [33] | | Japan |
| [31] | | 43/31769 |

[54] HYDRAULIC CONTROL SYSTEM FOR AN AUTOMATIC TRANSMISSION MECHANISM
22 Claims, 10 Drawing Figs.

| [52] | U.S. Cl. | 74/868 |
| [51] | Int. Cl. | B60k 17/00 |
| [50] | Field of Search | 74/868 |

[56] References Cited
UNITED STATES PATENTS

| 3,078,736 | 2/1963 | Meads et al. | 74/868 |
| 3,167,970 | 2/1965 | Wagner et al. | 74/868 |
| 3,237,476 | 3/1966 | Jandasek | 74/868 |
| 3,398,607 | 8/1968 | Chana | 74/868 |

*Primary Examiner*—C. J. Husar
*Attorney*—John Lezdey

ABSTRACT: A hydraulic control system for an automatic transmission mechanism for an automotive vehicle to reduce a shifting time upon manual downshifting by raising line pressure for effecting good engine-braking function. This system comprises a throttle backup valve means for providing high fluid pressure without respect to the low throttle opening in engine, and a backup schedule valve for controlling the operation of the throttle backup valve depending upon the position of the selector valve means.

INVENTOR
TETSUYA IIJIMA
BY John Pegley
ATTORNEY

HYDRAULIC CONTROL SYSTEM FOR AN AUTOMATIC TRANSMISSION MECHANISM

The present invention relates to a control system for a power transmission mechanism in multiple speed ratios, and more particularly to a hydraulic control system for an automatic transmission of a vehicle.

Automatic transmission mechanism having planetary gear sets usually includes a plurality of friction elements, such as friction clutch and friction brake, to provide a plurality of gear ratios through selective coupling of the friction elements. To perform smooth shifting between the gear ratios, the hydraulic control systems are so constructed as to detect engine output and vehicle speed and to change the capacity of the friction elements by regulating the actuating hydraulic pressure in relation to the detected values.

The torque of the friction elements, that is, the transmission torque of the friction clutch and braking torque of the friction brake, must be changed in accordance with the engine loads and vehicle speeds. The necessary torque capacity increases as the engine load increases and it must be relatively large at starting or low speed and relatively small at higher speeds. In the following description and claims, the "friction clutch" is intended to mean engageable and disengageable means to connect or disconnect torque transmission between rotatable members, the "friction brake" and engageable and disengageable means to clamp or release a rotatable member to the stationary portion of the transmission mechanism, and the "friction element" such friction clutch and friction brake.

If the torque capacity of such friction element is too small compared to necessary torque capacity at a given time, the slippage between the members to be clamped to each other will be too much and thus an inaccurate operation or runaway of the engine will result. If, in contrast, the torque capacity of the friction element is too large, the clutch or brake will engage instantaneously and severe shocks will result. As the torque capacity depends on the level of the hydraulic pressure which actuates the hydraulic piston operating the friction element, smooth shift operation can be obtained without great slippage and without any uncomfortable shock by controlling the hydraulic pressure to minimize the difference between the torque capacity of the friction element and the necessary torque to be transmitted or braked.

In known vehicles, when a low-speed gear ratio is manually selected for an engine-braking effect while the vehicle is running at a high-speed gear ratio, the actuating hydraulic pressure becomes lower than before as the engine is generally operating at lower output than before, so that the capacity of the friction element is accordingly small. This means that the engine-braking function will not be effective as the engaging friction brake slips in a great amount and does not serve to conclude the shifting rapidly.

When the conventional automatic transmission is desired to manually shift from the intermediate to low-speed ratio for effecting an engine-braking function so that the foot is released away from the accelerator pedal, shifting vehicle speed limit upon downshifting from the intermediate to the low-speed ratio becomes lower than before with the result that when it is desired to shift down the speed gear ratio in high vehicle speed the operator should depress the accelerator pedal. This depressing operation is in reverse in comparison with the normal operation to apply a brake.

Therefore, it is a primary object of the present invention to provide a hydraulic control system for an automatic transmission in which means are provided to increase the level of the actuating hydraulic pressure at a high-speed and low-engine-torque operation, so that the capacity of the friction elements is increased and shifting to desired low-speed ratio is concluded rapidly.

It is another object of the present invention to provide the above-mentioned hydraulic pressure which is effected only at a predetermined manually selected position, so as not to result adverse effect to ordinary operation.

Still another object of the present invention is to provide such hydraulic control system, in which when the automatic transmission provides further low-speed ratio shifting range having engine-braking effect, the increased hydraulic pressure decreases again to prevent excess shock by providing too large capacity of the engaging friction brake, as the difference between the gear ratios of the shifting stages is relatively large.

Another object of the present invention is to provide above-mentioned hydraulic control system in which when the automatic transmission provides means to automatically upshift from low, intermediate speed to high speed, and the increase of hydraulic pressure is effected to the intermediate range, the hydraulic pressure will be great for the low to intermediate upshifting and results in excess shock, therefore, means are provided to prevent any increase of the hydraulic pressure at the upshifting.

A further object of the present invention is to provide above-mentioned hydraulic control system for providing a constant shifting limit speed from intermediate to low-speed ratio regardless of the accelerator opening.

A still another object of the present invention is to provide the above-mentioned hydraulic control system for enabling the shifting from the intermediate to low-speed ratio always at the same vehicle speed.

Further and more specific objects, features and advantages of the present invention are made apparent in the following detailed description of the preferred embodiments, by way of examples wherein the reference is made to the accompanying drawings, in which.

Figure 1:
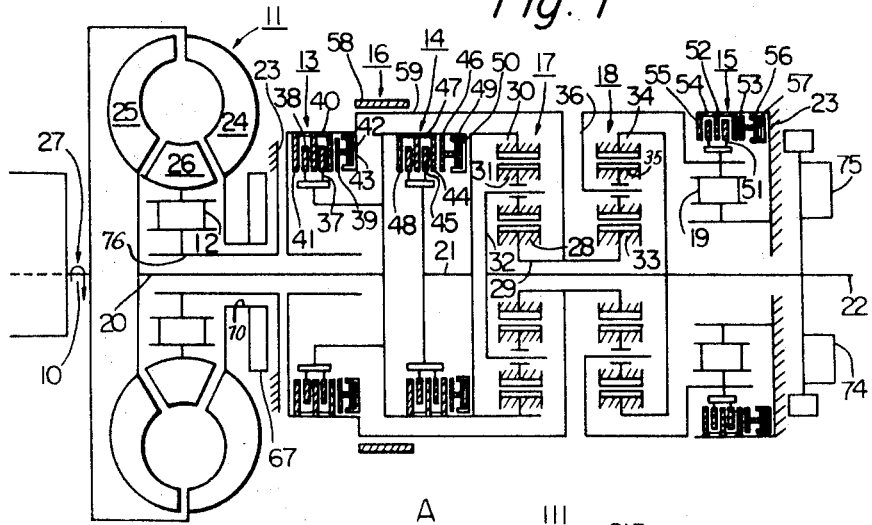
FIG. 1 is a diagrammatic illustration of a power transmission mechanism of the automatic transmission of a vehicle.

Referring to FIG. 1, which shows a schematic view of a power train in an automatic transmission which is controlled by a hydraulic control system according to the present invention, the train comprises a drive shaft 10 such as a crankshaft of the vehicle engine, a hydrodynamic torque converter 11 such as a hydraulic torque converter with one-way brake 12, hydraulically operated friction clutches 13 and 14 with an actuator as will be described, hydraulically operated friction brakes 15 and 16 with an actuator as will be described, planetary gear sets 17 and 18, a one-way brake 19, intermediate shafts 20 and 21, and a driven shaft 22 connected by any suitable means (not shown) with the driving road wheels of the vehicle. All of the shafts 10, 20, 21 and 22 are rotatably disposed with respect to the transmission housing 23 and the shafts 20 and 21 are in effect guided with respect to the shafts 10 and 22.

The hydraulic torque converter 11 comprises a vaned impeller element 24, a vaned rotor or driven element 25 and vaned stator or reaction element 26. The vaned elements 24 and 25 are disposed within a fluidtight casing (not shown) part of which is formed by the casing of the impeller 24. The impeller 24 is driven from the drive shaft 10. The rotor 25 is fixed to the first intermediate shaft 20, the stator 26 is rotatably disposed on a stationary sleeve 70 which is fixed to the transmission casing 23, and the one-way brake 12 is disposed between the stator and the sleeve.

The one-way brake 12 may be of any suitable construction and is so arranged as to allow a free rotation of the stator 26 in the forward direction of the vehicle, that is in the same direction in which the drive shaft 10 rotates as indicated by the arrow 27 and prevent the rotation of the stator 26 in the reverse direction.

The torque converter 11 functions in a manner well known of such torque converters for driving the rotor or driven element 25 at an increased torque with respect to the torque impressed on the impeller 24 of the converter. The vanes of the stator 26 function to change the direction of the flow of fluid between the rotor and impeller so as to provide an increased torque to the driven element 25. In this case the reaction on the stator 26 takes place in the direction reverse to the rotation of the drive shaft 10, so that the one-way brake 12 engages and prevents the rotation of the stator in this direction. When the speed of the driven element or rotor 25 reaches a predetermined value, the reaction on the vanes of the stator 26 changes in direction, tending to rotate the stator in the forward direction, and the one-way brake 12 releases and allows such rotation of the stator. Here, the torque converter 11 functions as a simple fluid coupling to drive the rotor 25 at substantially the same speed and with no increase in torque with respect to the impeller 24.

The first planetary gear set 17 comprises a first sun gear 28 which is formed on a sleeve portion 29 which is rotatable on the driven shaft 22, a first ring gear 30 connected with the second intermediate shaft 21, a plurality of first planet gears 31 and a planet gear carrier 32 connected with the driven shaft 22. Each of the planetary gears 31 is in mesh with the sun gear 28 and also with the ring gear 30.

The second planetary gear set 18 comprises a second sun gear 33 formed on the sleeve portion 29 which is rotatable on the driven shaft 22 integrally simultaneously with the first sun gear 28, a second ring gear 34 which is formed on the driven shaft 22, a plurality of second planet gears 35 and a planet gear carrier 36. Each of the planetary gears 35 is in mesh with the sun gear 33 and also with the ring gear 34.

The first clutch 13 is so arranged as to connect a drive portion 37 which is connected with the first intermediate shaft 20 with the sleeve portion 29 connected with the first and second sun gears 28 and 33 through a driven portion 40 connected thereto.

The first clutch 13 comprises a movable pressure plate 39 splined to the driven portion 40 and adapted to press the drive portion such as a friction disc 38 and the driven portion such as a friction disc 41 so as to frictionally engage them with each other, actuator including an annular piston 42 which is provided for actuating the movable pressure plate 39 and is slidably disposed within an annular cylinder 43. The pressure from the piston 42 is transmitted to the pressure plate 39, and the pressure in the cylinder 43 for actuating the movable piston is given by an hydraulic system as will hereinafter be described in detail.

The second clutch 14 is so arranged as to connect a drive portion 47 connected with the first intermediate shaft 20 with a driven portion 48 connected with the second intermediate shaft 21.

The clutch 14 comprises a movable pressure plate 46 splined to a member 47 and adapted to press the drive portion such as a friction disc 44 and the driven portion such as a friction disc 45 together in frictionally engage them with each other, actuator including an annular piston 49 which is provided for actuating the movable pressure plate 46 and is slidably disposed within an annular cylinder 50 for actuating the movable piston is given by a hydraulic system as will hereinafter be described in detail.

The second brake 15 is so arranged as to connect a drive portion 51 connected with the second planet gear carrier 36 with a driven portion 52 connected with the transmission housing 23.

The second brake 15 comprises a movable pressure plate 53 splined to a member 54 and adapted to press the drive portion such as a friction disc 51 and the driven portion such as a friction disc 52 so as to frictionally engage them with a member 55 which acts as a pressure member on the other side of the discs, actuator including an annular piston 56 which is provided for actuating the movable pressure plate 53 and is slidably disposed within an annular cylinder 57 for actuating the movable piston is given by an hydraulic system as will hereinafter be described in detail.

The one-way brake 19 may be of any suitable construction and is so arranged as to allow a free rotation of the drive portion 52 of the second brake 15 in the forward direction, that is, in the direction in which the drive shaft 10 rotates and prevents the rotation of the drive portion 52 thereof in the reverse direction.

Figure 2B:
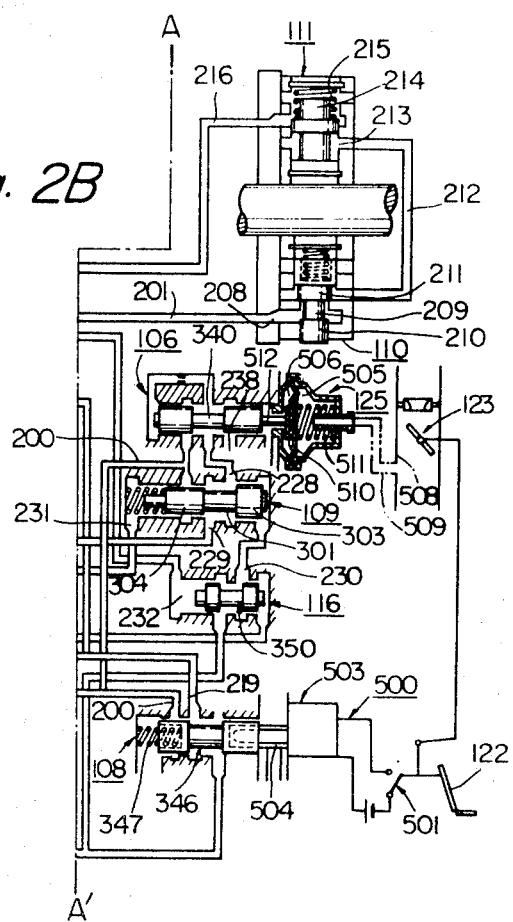
FIG. 2A and 2B are diagrams of one embodiment of the hydraulic control system according to the present invention adapted for controlling the transmission shown in FIG. 1 wherein a selector lever is set at a neutral position.
Figure 2A:
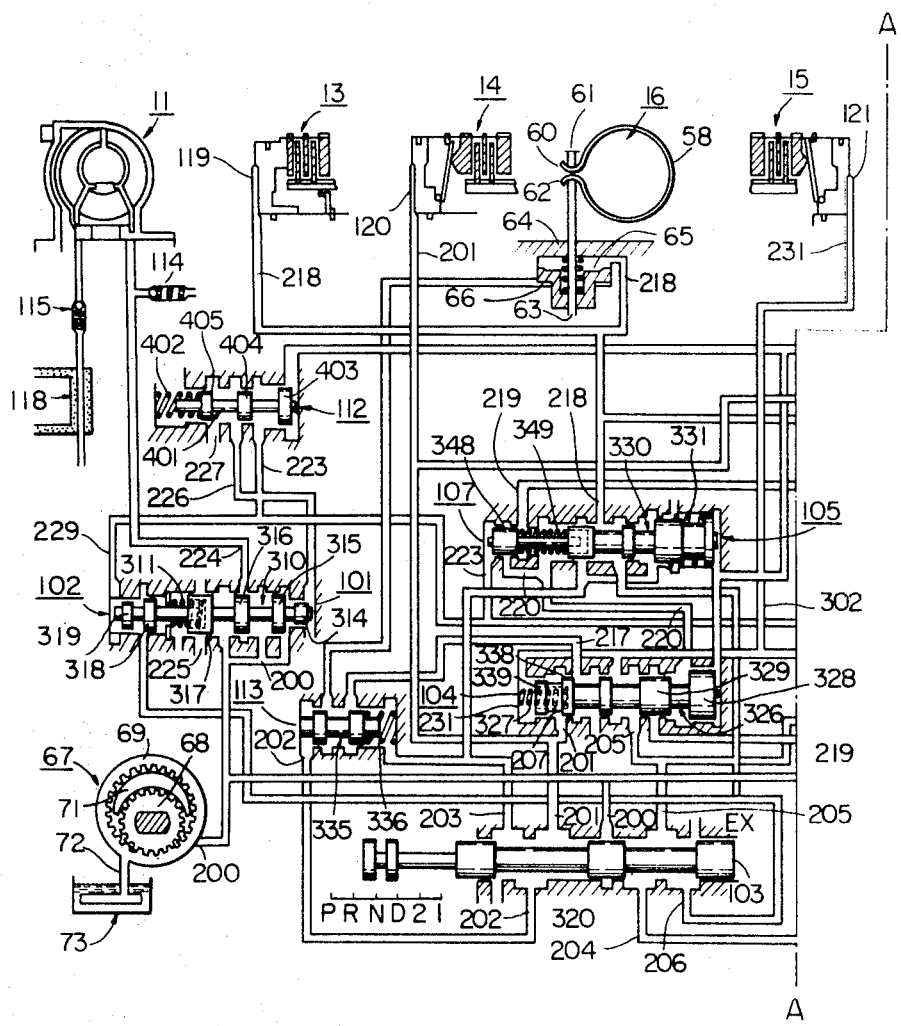

The brake 16 comprises a brake band 58 mounted on a drum portion 59 for thereby braking the sun gears 28 and 33. Referring in particular to FIGS. 2A and 2B, it will be observed that one end 60 of the band 58 is fixed relative to the transmission casing 23 through a strut 61, and the other end 62 thereof is fixed to a rod 63 for tightening the band on the drum portion 59 (FIG. 1) by means of an actuator 64 such as a hydraulic pressure servo for energizing hydraulically the band 58, which servo 64 comprises a hydraulic pressure chamber 65 for tightening the band 58 when hydraulically energized, and another hydraulic pressure chamber 65 for releasing the band 58 when hydraulically energized.

This power train also comprises a pump 67 which provides a hydraulic pressure for a hydraulic control system as will be described hereinafter in detail. This pump 67 may be of any suitable construction, and as shown in FIGS. 1 and 2A comprises an inner gear 68 in mesh with an eccentrically disposed outer gear 69. The inner gear 68 is connected in a manner to be driven by the drive shaft 10 through an impeller casing (not shown) by means of a sleeve shaft 70 (FIG. 1) fixed to the impeller casing, and the gears 68 and 69 are disposed in a pump casing (not shown) fixed relative to the transmission housing 23, and the pump casing comprises a crescent-shaped portion 71 disposed between the gears 68 and 69, as shown in FIG. 2A. The inner gear 68 is driven by the drive shaft 10 in a counterclockwise direction so that the outer gear 69 accordingly rotates in this direction, and the pump 67 is thus caused to pump from an inlet conduit 72 to a discharge conduit 200. The inlet conduit is so arranged as to draw fluid out of a transmission sump 73 formed by an oil pan fixed at the bottom of the transmission.

The power train shown in FIG. 1 also comprises governors 74 and 75 driven by the driven shaft 22 for detecting the output shaft speed.

In operation, the transmission has a neutral condition and provides low, intermediate and high speed ratios in forward drive and a drive in reverse.

TABLE I

| Speed | Engagement | | | | | Engine braking |
|---|---|---|---|---|---|---|
| | Clutch 13 | Clutch 14 | Brake 16 | Brake 15 | One-way Brake | |
| First | — | 0 | — | — | 0 | — |
| Second | — | 0 | 0 | — | — | Middle. |
| Third | 0 | 0 | — | — | — | Low. |
| I first | — | 0 | — | 0 | — | High. |
| Reverse | 0 | — | — | 0 | — | Do. |
| Neutral | — | — | — | — | — | — |

In the above table I, the sign "–" indicates the disengagement of the frictional element and the sign "0" shows the engagement of the frictional element.

As shown in the above table I, the transmission is in neutral condition in which no clutches and brakes are coupled.

Referring now to FIGS. 2A and 2B, which show a hydraulic control system for an automatic transmission according to the present invention, the system generally comprises an oil pump 67 to provide a source of hydraulic pressure; a primary main regulator valve 101 for regulating the fluid pressure from the pump 67 and applied to the pistons for various friction brakes and clutches of the transmission, a secondary main regulator valve 102 for regulating the fluid pressure in such a manner that the pressure increases in response to the decrease in the intake manifold vacuum and that the pressure also increases when the transmission is in reverse operation as will be described hereinafter; a manually operated selector valve 103 for controlling the distribution of the line pressure to the servo means in the transmission for operation in different forward speed ratios and in reverse and having an N or neutral position, a D or drive position, a 2 or second position, a 1 or first position, an R or reverse position, and a P or parking position; an automatic first (low) to second (intermediate) speed ratio shift valve 104 hereinafter designated as a 1-2 valve for changing, the drive through the transmission from its first (low) forward speed for selectively distributing the line pressure into the actuator from the source; an automatic second (intermediate) to third (high) ratio shift valve 105 hereinafter designated as a 2-3 valve for changing the drive through the transmission from the second forward speed ratio to its third forward speed ratio for selectively distributing the line pressure into the actuator from the source; a throttle valve 106 for providing a throttle pressure that varies proportionally to the intake manifold vacuum; an automatic second to third ratio shift plug 107 hereinafter designated as a 2-3 shift plug for causing the 2-3 valve 105 to be actuated under the control of the throttle pressure for changing the drive through the transmission from its third to second speed ratio in response to the change in the throttle pressure; a kickdown valve 108 for shifting down the forward speed ratio from its third to second or from its second to first speed ratio; a throttle backup valve 109 for providing a high fluid pressure independently the low throttle opening of the engine; a first governor valve 110 for providing a fluid pressure increasing with the increase of the output shaft speed; a second governor valve 111 for providing a fluid pressure to apply the 1-2 valve and 2-3 shift valve when the vehicle speed exceeds a predetermined value so as to shift the speed ratio between the first and second, and between the second and third speed ratios; a pressure modifier valve 112 for controlling the fluid pressure in response to the throttle pressure when the governor pressure is high and for controlling the fluid pressure so as to increase it stepwise when the governor pressure is low or substantially zero; a second speed-locking valve 113 for at all times maintaining the second speed; independently the changes of the governor pressure, vehicle speed and throttle pressure; a torque converter relief valve 114 for relieving the fluid pressure applied to the torque converter when it exceeds a predetermined valve; a torque converter pressure-keeping valve 115 for maintaining the fluid pressure in the torque converter at a predetermined constant pressure; a backup schedule valve 116 for providing high fluid pressure without respect to the throttle pressure when the selector valve is shifted to the second position; a cooler 118 for cooling the oil from the torque converter; a hydraulically operated actuator 119 for actuating the first clutch 13; a hydraulically operated actuator 120 for actuating the second clutch 14; a hydraulically operated actuator 121 for actuating the third clutch 15. This system further comprises in addition to the above an accelerator control or pedal 122 which has an ordinary mechanical connection with the carburetor butterfly valve 123 for the internal combustion vehicle driving engine which may include a link 124 connecting the carburetor throttle valve with the accelerator pedal 122; a diaphragm assembly 125 for actuating the throttle valve 106; a kickdown switch 126 operated under the control of the accelerator pedal 122; a kickdown solenoid 127 for actuating the kickdown valve 108 when energized.

In operation, the transmission and its hydraulic control system are controlled by the vehicle operator by means of the accelerator 122 of the vehicle and the manual selector lever (not shown) connected with the manual selector valve 103. The manual selector valve 103, as has been described, has six different positions of N or neutral position, D or drive position, 2 or second position, 1 or first position, R or reverse position, and P or parking position as indicated in FIG. 2A, the drive range having low or first, intermediate or second and high or third speed ratio. The transmission is conditioned for various types of operation by moving the selector valve 103 into the positions corresponding to the type of a desired operation so as to distribute the fluid or line pressure into a predetermined line as designated in table II as follows:

TABLE II

| Selected position | P | R | N | D | 2 | 1 |
|---|---|---|---|---|---|---|
| Line: | | | | | | |
| 201 | – | – | – | 0 | 0 | 0 |
| 202 | – | – | – | 0 | 0 | – |
| 203 | – | – | – | 0 | – | – |
| 204 | 0 | 0 | – | – | 0 | 0 |
| 205 | 0 | 0 | – | – | – | 0 |
| 206 | – | 0 | – | – | – | – |

In the above table II, the sign "–" indicates no flow of the fluid pressure while the sign "0" shows the flow of the pressure to the line.

The transmission is maintained in its neutral condition with the manual selector valve 103 held in the neutral position, as shown in FIG. 2A. In this condition of the transmission and its hydraulic controls, the accelerator 122 is assumed to be in its closed throttle position; although the movement of the accelerator toward its open throttle position, when the manual selector valve 103 is in this position, exercises no effect on the condition of the transmission to complete a drive through it. The engine is started with the selector valve 103 in the neutral position, and prior to such operation of the engine, no fluid pressure exists in the hydraulic system since the pump 67 is not in operation. The pump 67 is driven from the transmission drive shaft 10 and thereby from the vehicle engine.

When the engine starts, the pump 67 driven by the engine supplies a line pressure to the conduit 200.

For forward driving, the transmission is ordinarily operated in drive range in which low or first, intermediate or second and high or third speed ratio power trains are alternately made effective for driving the driven shaft 22 and thereby the vehicle and in which the transitions between these three drives is automatically accomplished by the automatic control system.

The line pressure is supplied from the conduit 200 through the manual selector valve 103 to the conduit 201 and accordingly to the actuator 120, thereby holding the second clutch 14 at all times in a coupling position. The conduit 201 connects the selector valve 103 with the 1-2 valve, and the line pressure in the conduit 201 is thus supplied to the 1-2 valve, particularly to the port 207. In the first speed ratio of the drive range the spool 326 is urged by the spring 327 toward the rightmost as shown in FIG. 2A thereby shutting off the line pressure to the first brake 16. The vehicle runs forward with the second clutch 14 engaged and with the one-way brake 19, whereupon due to the action of the one-way brake 19 which allows a free rotation of the drive portion 52 of the clutch in the forward direction, that is, in the direction in which the drive shaft 10 rotates and prevents the rotation of the drive portion 52 thereof in the reverse direction, the torque of the engine may not be transmitted from the driven shaft 22 to the drive shaft 10 so that an engine-braking action is not attained.

The throttle opening movement of the accelerator provides an additional power for driving the vehicle in this speed range, and this movement of the accelerator also exerts other effects on the hydraulic control system so as, for one thing, to increase the line pressure effective on the applying pistons associated with the second clutch 14 for increasing the applied pressures in these mechanisms and, for another thing to increase the fluid pressure within the converter 11.

The conduit 201 connects the selector valve 103 with the first governor valve 110. The line pressure, which increases in correspondence with the vehicle speed, is applied to the port 208 of the first governor valve 110 and thereby to the spool 209 which has a smaller land 210 and a larger land 211 so that the pressure difference therebetween causes the spool 209 to move so as to pass the line pressure from the conduit 201 through the first governor valve 110 into the conduit 212 and thereby to the port 213 of the second governor 111, in which the pressure of the spool 214 is balanced with the compression of the spring 215 so that the second governor 111 generates a governor pressure increasing in response to the increase of the output shaft speed, which pressure is connected through the space produced by the balance with the conduit 216, which is connected with the rightmost end of the 1-2 valve. The spool 326 of the 1-2 valve 104 is thus moved leftwards of FIG. 2A with the result that the line pressure from the conduit 201 is connected with the conduit 217 which is connected through the second speed-locking valve 113 with the conduit 66 of the actuator 64 of the brake 16 so as to tighten the band 58 thereof with the result that the speed ratio is shifted to the second as shown previously in the table I.

With the vehicle speed further increasing, the governor pressure from the second governor 111 correspondingly increases to move the 2-3 valve spool 330 leftwards against the tension of the spring 349 so that the line pressure from the conduit 203 connected with the manual selector valve 103 is introduced through the 2-3 valve to the conduit 218 connected with the conduit 65 of the actuator 64 of the brake 16 so as to release the band 58 of the first brake 16. On the other hand, the line pressure from the conduit 218 is applied to the actuator 119 of the first clutch 13 through the conduit 218 connected with the actuator 119 so as to provide a drive train of the third speed ratio between the drive shaft 10 and driven shaft 22 as shown in FIG. 2A.

Upon movement of the manual selector valve 103 to the position 2 in FIG. 2A, the line pressure is supplied from the conduit 200 through the manual selector valve 103 to the conduit 201 and accordingly to the actuator 120 so that the line pressure always urges the second clutch 14 so as to engage.

The line pressure is also supplied from the conduit 200 through the manual selector valve 103 to the second speed-locking valve 113 at its leftmost end through the conduit 202 with the result that the line pressure moves the spool 335 rightwards against the action of the spring 336. Thus, the line pressure from the selector valve 103 is supplied from the conduit 202 through the locking valve 113 to the conduit 66 of the actuator 64 to cause the band 58 of the brake 16 to be tightened. Thus, this provides a drive train of the second speed ratio between the shafts 10 and 22 as shown in FIG. 2A, and this second speed ratio is maintained independently the changes of the vehicle speed, throttle pressure and governor pressure.

When the manual selector valve 103 is set at the position 1 in FIG. 2A, the line pressure is supplied from the conduit 200 through the manual selector valve 103 to the conduits 201, 204 and 205. The line pressure from the conduit 201 is supplied to the second clutch 14.

The line pressure is also supplied from the conduit 205 to the 1-2 valve and accordingly to the actuator 121 of the second brake 15 to cause the provision of the first speed ratio. With the vehicle speed increasing, the governor pressure to be applied to the rightmost end of the 1-2 valve from the conduit 216 correspondingly increases with the result that the pressure moves the 1-2 valve spool 326 leftwards similarly to that as previously described so that the line pressure from the conduit 201 connected with the manual selector valve 103 is supplied through the second speed-locking valve 113 to the actuator 64 connected with the first brake 16 to cause the provision of the second speed ratio. While the selector valve is in the 1 position, the line pressure is not applied to the conduits 203 and 206 with the result that it does not supply the line pressure to the actuator 119 connected to the first clutch so that it does not provide the third speed ratio.

In the comparison of the operation of the first speed in the drive range with this first speed of the position 1 of the manual selector valve 103, the line pressure operates to energize the second brake 15 instead of the operation of the one-way brake with the result that the line pressure carries secure fixedly the carrier 36 of the second planetary gear set 18 so that the power from the driven shaft is transmitted to the drive shaft 10 thereby providing an engine-braking effect.

Upon movement of the manual selector valve 103 to the position R in FIG. 2A, the line pressure is supplied from the conduit 200 to the conduits 204, 205 and 206. The line pressure in the conduit 205 is supplied through the 1-2 valve to the actuator 121 of the second brake 15 as previously described. The line pressure from the conduit 206 is supplied through the 203 valve to the relief side of actuator 64 of the first brake 16 and is also supplied to the actuator 119 of the first clutch 13 so that the driven shaft 22 is driven in a reverse direction by the drive shaft 10.

In the hydraulic control system, the first and second governor valves 110 and 111 function as follows:

The line pressure from the conduit 201 connected with the manual selector valve 103 is supplied through the conduit 201 to the port 208 of the first governor valve 110 and accordingly to the spool 209 which has a smaller land 210 and a larger land 211 so that the pressure difference between the lands 212 and 213 urges the spool 209 to pass the line pressure from the conduit 201 to the conduit 212 and thereby to the port 213 of the second governor 111, in which the force of the spool 214 is balanced with the compression of the spring 215. Thus, the second governor 111 generates the governor pressure increasing in response to the increase of the output shaft speed by means of the balance between the centrifugal force of the spool 216 and the compression of the spring. This governor pressure is introduced to the rightmost end of the 1-2 valve. The spool 326 of the 1-2 valve 104 is thus moved leftwards of the drawings with the result that the line pressure from the conduit 201 is connected with the conduit 217 which is connected through the second speed-locking valve 113 with the conduit 66 of the actuator 64 of the first brake 16 so as to tighten the band 58 thereof. With the vehicle speed further increasing, the governor pressure delivered from the conduit 216 connected with the second governor valve 111 correspondingly increases to move the 2-3 valve spool 330 leftwards of the drawing against the tension of the spring 349 so that the line pressure from the conduit 203 connected with the manual selector valve 103 is connected through the 2-3 valve with the conduit 218 connected with the conduit 65 so as to release the band 58 of the first brake 16. Thus, in response to the change of the governor pressure transmitted through the governor valve 110 and 111, the speed ratio is automatically shifted accordingly.

The governor pressure delivered from the conduit 216 is also applied to the rightmost end of the pressure modifier valve 112 so as to control the fluid pressure applied to the brake and clutches as will be hereinafter described in detail.

The kickdown circuit 500 in the hydraulic control system comprises in addition to the kickdown valve 108 for shifting down the forward speed ratio and including a spool 346 and a spring 347 for urging the spool 346 rightwards in FIG. 2B and the accelerator 122; a kickdown switch 501 which closes its contact when the accelerator is depressed approximate 80 percent of the full stroke by the operator; a source of an electric energy 502; a kickdown solenoid device 503 which is electrically energized by an electric current from the source 502 when the accelerator 122 is fully depressed to close the contact of the switch 501 for projecting a rod 504 so as to move the kickdown spool 346 leftwards in the drawings against the spring 347.

In operation, when the accelerator 122 is fully depressed by the operator, the switch 501 becomes closed so that the solenoid device 503 becomes energized thereby with the result that the kickdown valve spool 346 is moved leftwards through the rod 504, whereby the line pressure from the conduit 200 is supplied through the kickdown valve 108 and a conduit 219 with the 2-3 valve 105 in terms of kickdown pressure, thereby urging the kickdown valve spool 330 rightwards of the drawing and balancing with the governor pressure applied to the rightmost end of the 2-3 valve so as to shift down the gear ratio from the third to the second speed ratio. The 2-3 valve pressure is also supplied through the 2-3 valve and the conduit 220 to the 1-2 valve 104 which has a larger land 328 and a smaller land 329 with the result that the kickdown pressure applied to the difference of the area between the lands 328 and 329 urges the 1-2 valve spool 326 rightwards of the drawing so that kickdown pressure shifts down the gear ratio from the second to the first speed ratio against the governor pressure applied to the rightmost end of the 1-2 valve balancing therebetween.

In order to detect the engine power in the hydraulic control system so as to permit the throttle valve 106 to operate properly, the throttle valve 106 is actuated by the diaphragm assembly 125 which comprises a vacuum chamber 505 communicating with the intake manifold 508 of the engine by a conduit 509, an atmospheric pressure chamber 506 communicating with the atmosphere, a diaphragm 510, a spring 511 disposed within the vacuum chamber 505 and urging the diaphragm 510 toward the atmospheric chamber 506. The vacuum generated in the intake manifold pulls the diaphragm 510 toward the vacuum chamber 505 against the compression of the spring 511 with the result that a rod 512 connected with the diaphragm 510 and disposed in the atmospheric pressure chamber 506 causes the throttle valve spool 340 move rightwards so that the line pressure from the conduit 200 connected with the pump 67 is leaked through the throttle valve 106 and the conduit 221 to the oil sump (not shown) so as to reduce the line pressure with displacement of the rod 512 with the variation in the engine power due to the change of the vacuum in the intake manifold. The throttle pressure delivered from the conduit 222 connected with the throttle valve 106 is applied to the secondary main regulator valve 102 and to the 2-3 shift plug 107 through the conduit 223 so that the line pressure is changed in response to the change of the throttle pressure and is raised when the engine power is increased. The throttle pressure thus actuates the 2-3 valve so as to shift the speed ratio in response to the change in the throttle pressure from the third speed ratio to the second speed ratio or vice versa.

The primary and secondary main regulator valves 101 and 102 comprise spools 310 and 311, a spring 312 and function as follows:

When the spool 310 is urged rightwards by the spring 312 the fluid pressure delivered from the oil pump 67 is applied to the conduit 200 connected with the primary main regulator 101 which comprises a larger land 315 and smaller land 314 mounted on the regulator valve spool 310 between which the fluid pressure is applied through the conduit 200 so that the spool 310 is moved thereby leftwards to allow the fluid to pass through the conduit 224 connected with the primary main regulator valve 101 into the torque converter 11. As the fluid pressure further increases, the main regulator valve spool 310 moves leftwards of the drawing so as to permit the fluid pressure to leak into the oil sump through the conduit 225 to regulate the fluid pressure so as not to exceed a predetermined value. The line pressure to be delivered through the conduit 200 is thus controlled automatically in response to the balance between the smaller and larger lands 314 and 315, and the force applied from left side as will be described.

The secondary main regulator valve 102 functions as follows:

The secondary main regulator valve 102 receives the throttle pressure from the throttle valve 106 to the leftmost end of the secondary main regulator valve 102 so that the line pressure is increased in accordance with the opening of the throttle valve up to a predetermined value. As was described, when the fluid pressure delivered from the oil pump 67 is applied to between the smaller and larger lands 314 and 315 on the primary main regulator valve 101 with the result that the regulator valve spool 310 is thus moved leftwards against the throttle pressure valve applied from the leftmost.

When the line pressure from the conduit 206 connected with the manual selector valve 103 is applied to between the larger and smaller lands 318 and 319 the secondary main regulator valve spool 310 is moved rightwards of the drawing against the line pressure applied to between the smaller and larger lands 314 and 315.

Figure 5:
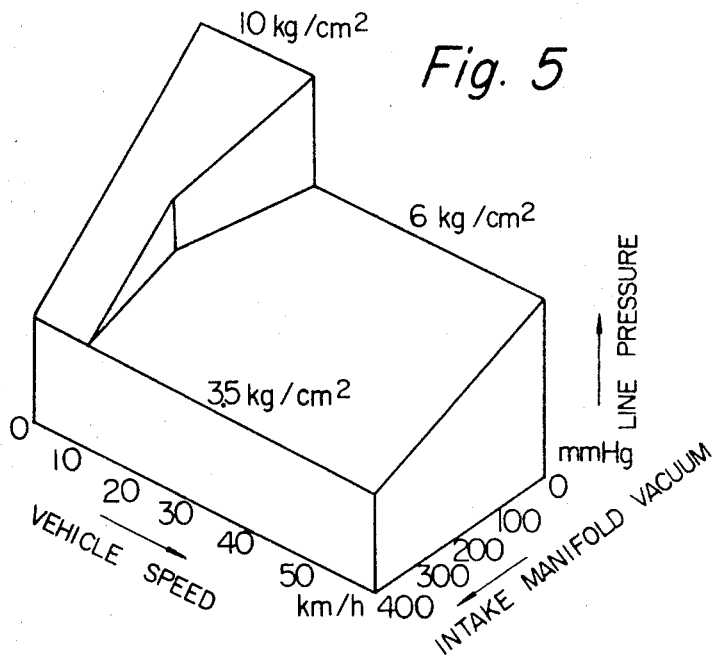
FIGS. 5 and 6 are graphical representations of fluid or line pressure in the system in terms of the vehicle speed and engine intake manifold vacuum.

The pressure modifier valve 112 functions as follows:

The pressure modifier valve 112 receives the governor pressure from the conduit 216 connected with the second governor valve at the rightmost end of the control valve 112 against the action of the spring 402 which is disposed at the leftmost end of the control valve. The control valve 112 also receives the throttle pressure delivered from the throttle valve 106 through the conduit 222, which pressure is applied to between the larger and smaller lands 403 and 404 and is served to urge the control valve spool 401 rightwards because of the difference in size therebetween. It follows that if the force produced by the governor pressure overcomes the force produced by the spring 402 and throttle pressure the control valve spool 401 moves leftwards of the drawing so that the throttle pressure is applied through the conduit 226 to the rightmost end of the primary main regulator valve 101. Thus the throttle pressure is applied to the rightmost end of the primary main regulator valve 101 and to the leftmost end of the secondary main regulator valve 102. Since there is a difference in size between the smaller land 314 disposed at the rightmost end of the primary main regulator valve 101 and the larger land 319 disposed at the leftmost end of the secondary main regulator valve 102, the line pressure is regulated in accordance with the opening of the throttle valve 106. On the other hand, if the force produced by the governor pressure is lower than that produced by the action of the spring 402 and the throttle pressure the control valve spool 401 moves rightwards so that the conduit 226 communicates with the drain port 227, thus applying the throttle pressure entirely to the leftmost end of the secondary main regulator valve 102 with the resulting increase in the line pressure. As shown in FIG. 5, which shows a graph of the line pressure in terms of the vehicle speed and engine intake manifold vacuum, the line pressure is high at low vehicle speed and increases steeply as the throttle pressure increases, so that the capacity of the friction-engaging mechanism is increased to satisfy a demand for a larger torque transmission at low vehicle speed. As the vehicle speed increases, the throttle pressure is applied to both ends of the regulator valve and the line pressure decreases stepwise. If the line pressure gradually increases as the throttle pressure increases, a sufficient degree of torque transmission capacity is attained in the friction-engaging mechanism at higher speed to prevent the shifting shock.

The throttle backup valve 109 comprises a throttle backup valve spool 301 and a spring 302, and the conduit 228 connected with the throttle backup valve 109 is connected with the throttle valve 106, the conduit 229 connected with the throttle backup valve 109 is connected with the primary main regulator valve 101 at the leftmost end thereof (FIG. 2A) and also with the 2-3 shift plug 107.

The conduit 230 connected with the throttle backup valve 109 is connected through the backup schedule valve 116 with the conduit 204 connected with the selector lever 103.

The conduit 231 connected with the throttle backup valve 109 is connected with the actuator 121 of the second brake 15 so that it introduces the line pressure from the conduit 200 through the throttle backup valve 109 thereto.

The throttle backup valve 109 functions as follows:

In the throttle backup valve 109, the diameter of the land 303 is larger than that of the land 304 so that the fluid pressure applied between the lands 303 and 304 effects thereto to cause the throttle backup valve spool 301 to move rightwards.

The fluid pressure applied through the conduit 230 from the rightmost (FIG. 2A) of the throttle backup valve 109 effects to urge the throttle backup valve spool 301 to move leftwards, while the fluid pressure in the conduit 231 connected with the throttle backup valve 109 is applied to the leftmost (FIG. 2A) of the land 304 so that it causes the throttle backup valve spool 301 to move rightwards.

The throttle backup valve 109 operates as follows:

1. When the line pressure is not introduced to the conduits 230 and 231, the throttle backup valve spool 301 is biased by the spring 302 so as to move to the rightmost position with the result that the conduit 228 communicates with the conduit 229 and is introduced by the throttle pressure from the throttle valve 106 changing in response to the engine torque as shown in FIG. 10.

Figure 3:
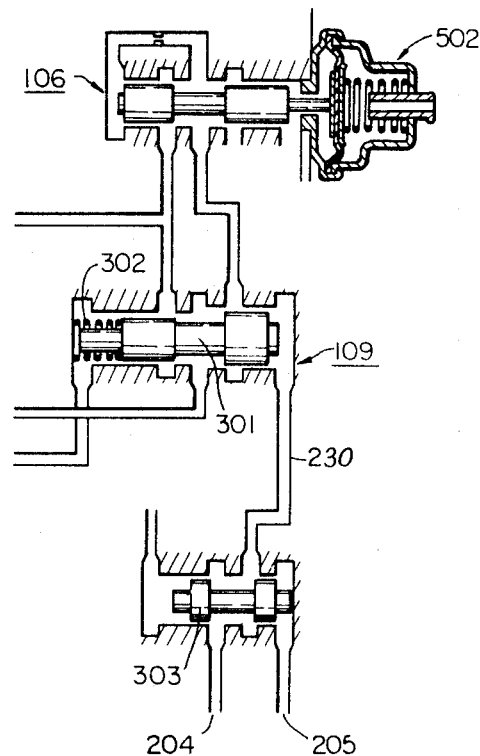
FIGS. 3 and 4 are partial schematic diagrams of a 2-1 schedule valve and kickdown cutoff valve with a 1-2 valve showing their operation.

2. As the line pressure is introduced merely to the conduit 230, the throttle backup valve spool 301 is so disposed as to balance the effort that the fluid pressure delivered through the conduit 230 urges it leftwards, and both the force that spring 302 and the fluid pressure in the valve chamber urges it rightwards as illustrated in FIG. 3 with the result that the line pressure delivered from the conduit 200 in terms of high fluid pressure source and the throttle pressure from the conduit 228 in terms of a low fluid pressure source balance with each other so that the regulated pressure varying independently the engine torque is delivered through the conduit 229 in terms of high fluid pressure.

3. When the line pressure is introduced to both the conduits 230 and 231, the force that the fluid pressure fed through the conduit 231 and the spring 302 urges the throttle backup valve spool 301 rightwards becomes larger than the force that the fluid pressure applied through the conduit 230 urges leftwards with the result that the valve spool 301 is urged to the rightmost position, then the throttle pressure changing in response to the engine torque is introduced to the conduit 229.

The conduit 229 is connected with the secondary main regulator valve 102 for the primary main regulator valve 101 so that the fluid pressure in the conduit 229 is applied to the leftmost end of the land 319 as described previously with the result that the line pressure is regulated in response to the change of the fluid pressure introduced through the conduit 229.

Figure 6:
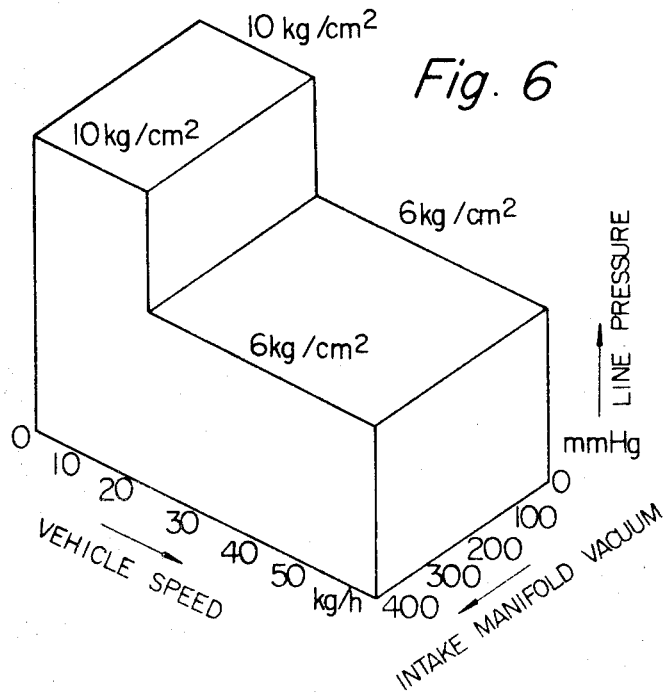

Referring now to FIG. 5, which shows a graph of the line pressure in relation to the vehicle speed and engine intake manifold vacuum, the line pressure is high at low vehicle speed and increases steeply as the throttle pressure increases, so that the capacity of the friction-engaging mechanism is increased to correspond to the large torque transmission demand at low vehicle speed. As the vehicle speed increases, throttle pressure is applied to both ends of the regulator valve, the line pressure decreases stepwise and gradually increases as the throttle pressure increases, so that sufficient transmission torque capacity is supplied to the friction-engaging mechanism at higher speed, and to prevent the shifting shock. The throttle pressure introduced to the conduit 229 is particularly illustrated in the drawing. On the other hand, the characteristics of the line pressure when the higher fluid pressure is introduced which pressure varies independently to the engine torque is shown in FIG. 6.

The fluid pressure delivered through the conduit 229 is reduced to a predetermined pressure through the throttle valve 107 so that it is introduced to the conduit 220, then it is introduced to the leftmost end of the 2–3 valve 105 and also to between the lands 328 and 329 on the 1–2 valve spool 326 to regulate the shifting speed.

Figure 7:
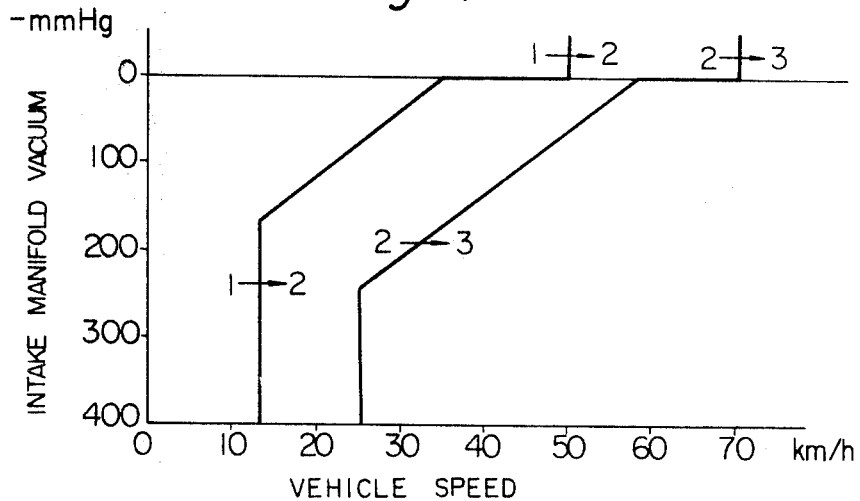
FIG. 7 is an upshift characteristics chart of D range in terms of the manifold vacuum and vehicle speed.

The characteristics of the upshifting upon drive range of the selector lever position is shown in FIG. 7.

Figure 8:
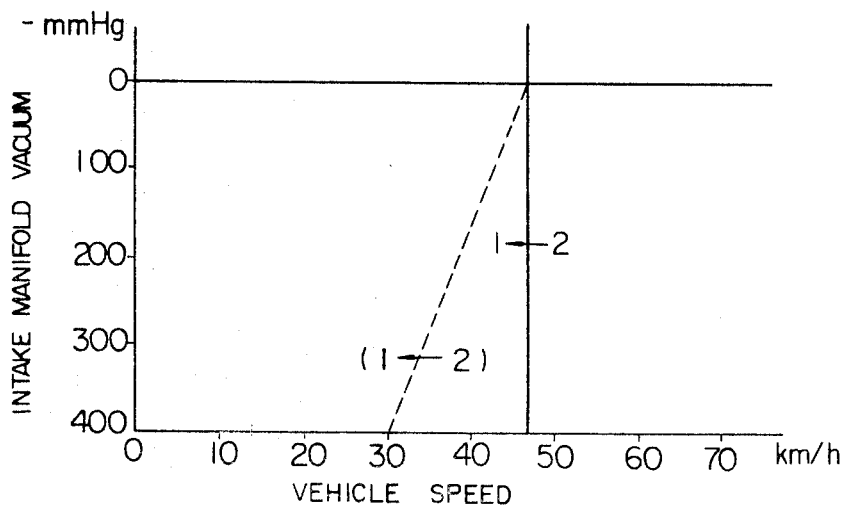
FIG. 8 is a downshift characteristics chart of L range in terms of the manifold vacuum and vehicle speed.

When the fluid pressure introduced through the conduit 229 becomes constant without respect to the engine load, that is, 2–1 speed shifting is affected by the operation thereof as denoted in FIG. 8, in which the broken line shows the case that the fluid pressure in the conduit 229 is normal throttle valve.

The backup schedule valve 116 comprises the backup schedule valve spool 350 on which the lands 351 and 352 has the same diameter, and the backup schedule valve 116 functions as follows:

The conduit 230 connected with the previous throttle backup valve 109 is connected with the backup schedule valve 116, and the conduits 204 and 205 connected with the selector valve 103 are connected with the backup schedule valve 116. The conduit 218 connected with the 2–3 valve and the actuator 123 for the brake 16 is connected with the backup schedule valve 116. Here, the fluid pressure delivered through the conduit 205 urges the backup schedule valve spool 350 leftwards, and the fluid pressure introduced through the conduit 232 urges the valve spool 350 rightwards.

The backup schedule valve 116 operates as follows:

1. Upon drive range of the selector lever 103 in the third speed, the line pressure delivered through the conduit 203 is introduced to the conduit 232 and the conduit 204 is communicated with the exhaust. As shown in FIG. 3 the backup schedule valve spool 350 is at the rightmost so that the conduit 204 is communicated with the conduit 230 with the result that there is no fluid pressure on the conduit 230.

2. When the selector valve 103 is shifted to the 2 position from the drive position, the line pressure is introduced through the conduit to the conduit 230.

3. As the selector valve 103 is shifted from the drive or 2 position to the 1 position, the line pressure is introduced to the conduit 205 from the conduit 200 so that since there is no fluid pressure in the conduit 232 the valve spool 350 is biased leftwards in FIG. 3 then the conduit 205 connected with the selector lever 103 is introduced to the conduit 230 so that the line pressure is delivered to the conduit 224.

Figure 4:
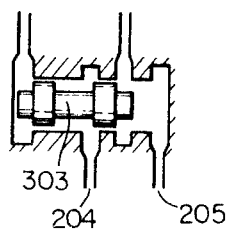

4. When the selector lever 103 is shifted from the 1 position to the 2 position the valve spool 350 is biased to the leftmost as shown in FIG. 4 so that there exists no fluid pressure in the conduit 230.

It is understood from the foregoing description as to the arrangement according to the invention that the following advantages are effected.

1. As the selector lever is shifted from the drive to the 2 position particularly when an engine-braking action is required, the speed ratio shifting is abruptly effected due to the line pressure increasing with the result that the engine-braking action is also quickly effected.

2. The gear speed ratio of the first speed is large so that the line pressure is low to cause smooth shifting without any shock.

3. The limiting vehicle speed for shifting from the second to the first speed in the 1 position of the selector lever is provided to be always constant in high speed independently of the operation of the throttle control of the engine.

4. When the transmission is upshifted from the 1 to the 2 of the selector lever 103 upon coasting so that the line pressure does not become high at the second speed, large shock may be avoided.

Figure 9:
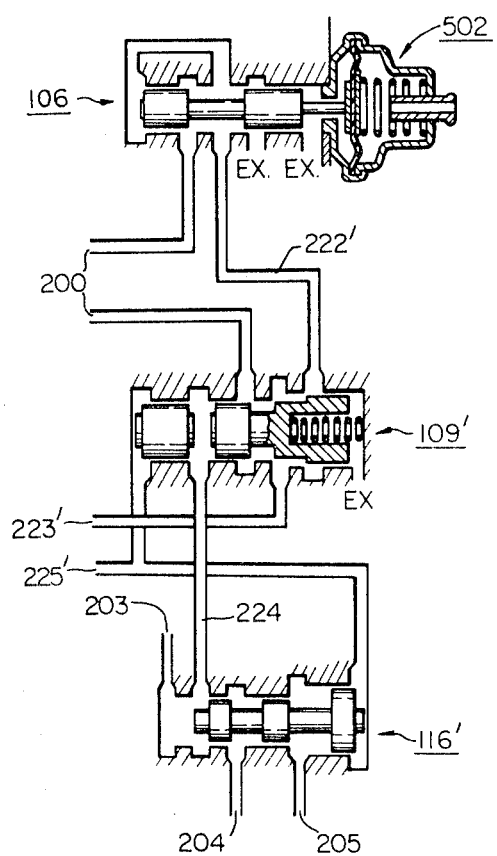
FIG. 9 is a partial schematic diagram of a throttle backup valve and backup control valve showing their operation.

Referring now to FIG. 9, which shows another embodiment of the throttle backup valve 109 and the backup schedule valve 116 shown in the preceding drawings which may be replaced in the arrangement shown in FIG. 2 wherein the same reference numerals are designated to the corresponding components and parts in FIGS. 1 to 2.

In the alternate arrangement as shown in FIG. 9, the throttle backup valve 109' comprises a spool 301 having two lands 302 and 303, another spool 306 biasing the spool 301 leftwards of the drawing. The backup schedule valve 116' comprises a spool 307 having three lands 308, 309 and 310, and the land 308 has larger diameter than the land 309 while the land 309 has the same diameter as the land 310.

The backup schedule valve 116' operates as follows:

1. Upon drive range of the selector lever 103, the line pressure delivers through the conduit 203. The backup schedule valve spool 307 is at the rightmost position so that the conduit 203 is communicated with the conduit 230' with the result that the fluid pressure is introduced to the conduit 230'.

2. When the selector valve 103 is shifted to the 2 position from the drive position, the conduit 203 is communicated with the exhaust, then the spool 307 remains at the rightmost position so that the conduit 230' is exhausted.

3. If the selector valve 103 is shifted to the 1 position, the line pressure is introduced to the conduit 205 so that the spool 307 is biased rightwards by the fluid pressure through the conduit 205 applied to the area difference between the lands 308 and 309, whereupon the fluid pressure in the conduit 230' is exhausted.

4. When the transmission is shifted from the second to the first speed in the 1 position, the line pressure is introduced to the conduit 235 to engage the brake 15, then the spool 307 is urged to the leftmost position by the fluid pressure through the conduit 231', whereupon the conduit 204 is connected with the conduit 230' so that the fluid pressure is introduced to the conduit 224' through the conduit 204.

5. When the selector valve 103 is shifted from the 1 to the 2 position, the valve spool 307 remains at the leftmost position so that there exists the fluid pressure in the conduit 230'.

Thus, this embodiment of the arrangement operates similarly to the previous embodiment shown in FIG. 2A.

In the arrangement, the conduit 200 connected with the throttle backup valve 109' is connected with the source of fluid pressure, the conduit 228' connected with the throttle backup valve 109 is connected with the throttle valve 106, the conduit 229' connected with the throttle backup valve 109 is connected with the primary main regulator valve 101 at the leftmost end thereof (FIG. 2A) and also with the 2–3 shift plug 107.

The conduit 230' connected with the throttle backup valve 109' is connected through the backup schedule valve 116'. The conduit 231' connected with both the throttle backup valve 109' and the backup schedule valve 116'.

The conduits 203, 204 and 205 connected with the backup schedule valve 116' are connected with the selector valve 103, respectively.

The throttle backup valve 109' operates as follows:

1. When the line pressure is introduced to the conduit 230', the spool 301 is urged by the fluid pressure with the result that the conduit 228' is connected with the conduit 229' so that the throttle pressure is introduced from the throttle valve 160 to the conduit 229'.

2. When the line pressure is introduced to neither the conduit 230' nor 231', the throttle backup valve spool 301 is so disposed as to balance the effort that the fluid pressure in the conduit 229' applied to the area difference between the lands 302 and 303 urges it rightwards, and the force of the spring 306 urges it leftwards with the result that the high fluid pressure is introduced to the conduit 229' without respect to the throttle pressure.

3. When the line pressure is introduced to the conduit 231', the force of the fluid pressure through the conduit 231' urging the throttle backup valve spool 301 rightwards becomes larger than the force of the spring 306 which urges leftwards so that the valve spool 301 is urged rightwards so that the throttle pressure is introduced to the conduit 229'. In the alternate arrangement of the valves 109' and 116', the throttle pressure backup valve 109' regulates the line pressure when the line pressure is not introduced to the conduit 230' in comparison with the previous first embodiment that the throttle backup valve 109 regulates the line pressure when the line pressure is introduced to the conduit 230'. This difference therebetween causes the backup schedule valve 116' to operate conversely but effects the same function.

It is clear that although the above description has been done as to the embodiment of three-speed forward transmission this may be applied to any multispeed transmission.

I claim:

1. A hydraulic control system for an automatic transmission mechanism for vehicle having a drive shaft and driven shaft, at least one planetary gear set disposed between said shafts, and a plurality of friction elements to provide at least low, intermediate and high speed gear ratios by selective engagement with each other with hydraulic pressure distributed in said hydraulic control system, said gear ratios including manually selectable lower gear ratios which provide engine-braking function, said hydraulic control system comprising:

a source of hydraulic pressure;
a plurality of hydraulic actuators for actuating said friction elements;
a regulating valve means for regulating fluid pressure from said source and applied to the actuators for the friction elements;
a manually operated selector valve means for controlling the distribution of the fluid pressure to said actuators;
automatic shifting valve means for selectively distributing the fluid pressure into said actuators from said source of hydraulic pressure;
a throttle valve means for providing throttle pressure that varies as a function of the intake manifold vacuum;
a governor valve means for providing governor pressure increasing as a function of the output shaft speed;
a first conduit for introducing the throttle pressure fed from the throttle valve means;
a second conduit for effecting said regulating valve means to increase the fluid pressure from said source;
a throttle backup valve means connected between said first and second conduits to introduce the throttle pressure from said first conduit to said second conduit; and
a third conduit connected at one end with the throttle backup valve means and at the other with said source of hydraulic pressure whereby when said selector valve means is selected to a predetermined position high fluid pressure is introduced from the third conduit to the second conduit so that the fluid pressure is controlled by means of said regulating valve means in response to the fluid pressure fed to the second conduit.

2. A hydraulic control system as set forth in claim 1, wherein said throttle backup valve means comprises:

a throttle backup valve spool;
a spring biasing the spool to connect the second conduit through the backup valve means with the first conduit connected with the throttle valve means for introducing the throttle pressure varying in response to the change of the engine load into the second conduit; and
a fourth conduit connected at one end with the backup valve means and at the other with the selector valve means to introduce the fluid pressure when the selector valve means is selected to the intermediate speed which provides an engine-braking action whereby when the fluid pressure is not introduced to the fourth conduit said first conduit is connected with the second conduit to cause the throttle pressure to be introduced into the second conduit while when the fluid pressure is introduced to the fourth conduit the connection between the first and second conduits is cut off so that high fluid pressure is introduced to the second conduit from the third conduit without respect to the throttle pressure.

3. A hydraulic control system as set forth in claim 2, wherein said throttle backup valve means comprises:

a spool having first and second lands formed different areas to which the fluid pressure is applied, and a spring whereby said spool is biased to connect the first conduit with the second conduit by the spring and the fluid pressure in the second conduit applied to the different area formed with the first and second lands.

4. A hydraulic control system as set forth in claim 3, further comprising:

a fifth conduit connected with one of said actuators which is communicated with the fluid pressure to shift to low speed which provides engine-braking action whereby when the fluid pressure is introduced to the fifth conduit said first conduit is connected with the second conduit without respect to the pressure in the fourth conduit.

5. A hydraulic control system as set forth in claim 4, wherein said spool is biased to connect the first conduit with the second conduit by the fluid pressure applied through the fifth conduit.

6. A hydraulic control system as set forth in any of claims 4 and 5, wherein said spool is biased to connect the third conduit with the second conduit by the fluid pressure applied through the fourth conduit.

7. A hydraulic control system as set forth in claim 4, wherein said spool is biased to connect in such a manner that the fluid pressure is introduced in the fourth conduit while the fluid pressure is not introduced to the fifth conduit so that constant high fluid pressure below the fluid pressure in the third conduit and above the fluid pressure in the first conduit is introduced into the second conduit.

8. A hydraulic control system as set forth in claim 4, wherein said spool is biased to connect the second conduit with the first conduit when the fluid pressure is introduced to the fifth conduit or the fluid pressure is not introduced to the fourth conduit so that the throttle pressure is introduced into the second conduit.

9. A hydraulic control system as set forth in claim 1, wherein said throttle backup valve means comprises:
   a throttle backup valve spool;
   a spring biasing the spool to connect the second conduit through the backup valve means with the third conduit connected at one end with the throttle backup valve means and at the other with said source of hydraulic pressure;
   a fourth conduit connected at one end with the backup valve means and at the other with the selector valve means to introduce the fluid pressure when the selector valve means is selected to the intermediate speed, which provides an engine-braking action; and
   whereby when the fluid pressure is introduced to the fourth conduit said first conduit is connected with the second conduit to cause the throttle pressure to be introduced into the second conduit while when the fluid pressure is not introduced to the fourth conduit the connection between the first and second conduit is cut off so that high fluid pressure is introduced to the second conduit from the third conduit without respect to the throttle pressure.

10. A hydraulic control system as set forth in claim 9 further comprising:
    a fifth conduit connected with one of said actuators which is communicated with the fluid pressure to shift to low speed which provides engine-braking action whereby when the fluid pressure is introduced to the fifth conduit said first conduit is connected with the second conduit without respect to the pressure in the fourth conduit.

11. A hydraulic control system as set forth in claim 10, wherein said spool is biased to connect in such a manner that when the fluid pressure is not introduced to the fourth conduit and the fluid pressure is not introduced to the fifth conduit the constant high fluid pressure below the fluid pressure in the third conduit and above the fluid pressure in the first conduit is introduced into the second conduit.

12. A hydraulic control system as set forth in claim 10, wherein said spool is biased to connect in such a manner that when the fluid pressure is introduced to the fourth conduit the throttle pressure is introduced into the second conduit.

13. A hydraulic control system as set forth in claim 10, wherein said spool is biased to connect in such a manner that when the fluid pressure is introduced to the fifth conduit the throttle pressure is introduced into the second conduit.

14. A hydraulic control system as set forth in claim 1, wherein said shifting valve means comprises:
    a spool; and
    a spring whereby said spool has two positions and is biased to one position by said spring and fluid pressure fed from the source of fluid pressure while said spool is biased to the other position by the governor pressure produced at said governor valve means.

15. A hydraulic control system as set forth in claim 1, wherein said shifting valve means comprises:
    a spool; and
    a spring whereby said spool has two positions and is biased to one position by said spring and fluid pressure in the second conduit while said spool is biased to the other position by that governor pressure produced at said governor valve means.

16. A hydraulic control system for an automatic transmission mechanism for vehicle having a drive shaft and driven shaft, at least one planetary gear set disposed between said shafts, and a plurality of friction elements to provide at least low, intermediate and high speed gear ratios by selective engagement with each other with hydraulic pressure distributed in said hydraulic control system, said gear ratios including manually selectable lower gear ratios which provide engine-braking function, said hydraulic control system comprising:
   a source of hydraulic pressure;
   a plurality of hydraulic actuators for actuating said friction elements;
   a regulating valve means for regulating fluid pressure from said source and applied to the actuators for the friction elements;
   a manually operated selector valve means for controlling the distribution of the fluid pressure to said actuators;
   automatic shifting valve means for selectively distributing the fluid pressure into said actuators from said source of hydraulic pressure;
   a throttle valve means for providing throttle pressure that varies as a function of the intake manifold vacuum;
   a governor valve means for providing governor pressure increasing as a function of the output shaft speed;
   a first conduit for introducing the throttle pressure fed from the throttle valve means;
   a second conduit for effecting said regulating valve means to increase the fluid pressure from said source;
   a throttle backup valve means connected between said first and second conduits to introduce the throttle pressure from said first conduit to said second conduit and including a throttle backup valve spool, a third conduit connected at one end with the throttle backup valve means and at the other with the fluid pressure in said source of hydraulic pressure;
   a backup schedule valve means for controlling the operation of said throttle backup valve means;
   a fourth conduit connected at one end with the backup valve means and at the other with the schedule valve to introduce the fluid pressure when the selector valve means is selected to the intermediate speed;
   a fifth conduit connected with one of said actuators which is communicated with the fluid pressure to shift to low speed which provides engine-braking action;
   a sixth conduit connected at one end with said backup schedule valve means and at the other with said selector valve means;
   a seventh conduit connected at one end with said backup schedule valve means and at the other with said selector valve means; and
   an eighth conduit connected at one end with said backup schedule valve means and at the other with any of said shifting valve means and selector valve means whereby only upon downshifting to the intermediate speed which provides the engine-braking action the high fluid pressure is introduced to the second conduit.

17. A hydraulic control system as set forth in claim 16, wherein when the selector valve means is selected to the intermediate speed position, the fluid pressure is introduced to said sixth conduit, when the selector valve means is selected to the low speed position, the fluid pressure is introduced to said seventh conduit, and when the selector valve means is selected to the high-speed position, the fluid pressure is introduced to said eighth conduit so that only upon downshifting the fluid pressure is introduced to the fourth conduit and so that when the fluid pressure is introduced to the fourth conduit while the fluid pressure is not introduced to the fifth conduit, high fluid pressure is introduced to the second conduit and so that when the fluid pressure is not introduced to the fourth conduit, the throttle pressure is introduced from the first conduit to the second conduit.

18. A hydraulic control system as set forth in claim 17, wherein said backup schedule valve means comprises:
    a spool which has two positions and is biased to one position when the fluid pressure is introduced to the seventh conduit so that the seventh conduit is connected with the fourth conduit and is biased to the other position when the fluid pressure is introduced to the eighth conduit so that sixth conduit is connected with the fourth conduit.

19. A hydraulic control system as set forth in claim 16, wherein when the selector valve means is selected to the intermediate speed position, the fluid pressure is introduced to said sixth conduit, when the selector valve means is selected to the low-speed position, the fluid pressure is introduced to said seventh conduit, and when the selector valve means is selected to the high-speed position, the fluid pressure is introduced to said eighth conduit so that only upon downshifting the fluid pressure is not introduced to the fourth conduit and when the fluid pressure is not introduced neither to the fourth conduit nor fifth conduit the high fluid pressure is introduced to the second conduit, and when the fluid pressure is introduced either to the fourth or fifth conduit or when the fluid pressure is introduced to both the fourth and fifth the throttle pressure is introduced from the first conduit to the second conduit.

20. A hydraulic control system as set forth in claim 19, wherein said spool has two positions and is biased to one position when the fluid pressure is introduced to the seventh conduit and when the fluid pressure is introduced to the eighth conduit so that the eighth conduit is connected with the fourth conduit, and is biased to the other position when the fluid pressure is introduced to the fifth conduit the sixth conduit is connected with the fourth conduit.

21. A hydraulic control system as set forth in claim 16, wherein said shifting valve means comprises:
a spool; and
a spring whereby said spool has two positions and is biased to one position by said spring and fluid pressure fed from the source of fluid pressure while said spool is biased to the other position by the governor pressure produced at said governor valve means.

22. A hydraulic control system as set forth in claim 16, wherein said shifting valve means comprises:
a spool; and
a spring whereby said spool has two positions and is biased to one position by said spring and fluid pressure in the second conduit while said spool is biased to the other position by that governor pressure produced at said governor valve means.